United States Patent Office 3,640,943
Patented Feb. 8, 1972

3,640,943
POLYMER-FILLER COMPOSITION
Edgar E. Bostick and George L. Gaines, Jr., Scotia, and Donald G. Le Grand, Burnt Hills, N.Y., assignors to General Electric Company
No Drawing. Filed July 7, 1969, Ser. No. 839,616
Int. Cl. C08g 51/04
U.S. Cl. 260—375 B  21 Claims

ABSTRACT OF THE DISCLOSURE

A polymer-filler composition having improved properties comprised of a base polymer, a filler and a surface-active additive which is a block copolymer. The block copolymer additive contains at least two polymerized comonomers, one of which is compatible with the base polymer thereby imparting stability to the composition, and the second of which is surface-active in the composition so that the block copolymer is concentrated at the interface between the filler and base polymer to provide a bond therebetween.

---

This invention relates to the polymer art. Specifically, it relates to a process for preparing polymer-filler compositions with improved properties such as improved impact strength, and also concerns new polymer-filler compositions.

A particular filler is usually added to a polymer to improve certain properties of the molded product such as increase its stiffness, impart to it a greater dimensional stability or increase its tensile strength. The improved properties provided by a filler, however, are usually offset by an accompanying increase in brittleness resulting in a product with undesirably low impact or tensile strengths. Basis for such brittleness may be poor wetting of the filler by the polymer resulting in void formation, or too great a difference in hardness between the polymer and filler causing high stress at the interface and rupture.

It is an object of the present invention to produce a polymer-filler composition with certain properties superior to those attainable in the past by providing means for enhanced interaction therebetween. This interaction means is a surface-active block copolymer which is stable in the present invention.

Briefly stated, the composition of the present invention is comprised of a base polymer, a filler and a block copolymer additive. The block copolymer contains at least two polymerized comonomers, one of which is compatible with the base polymer and the second of which is surface-active in the composition. In the preparation of the composition, the block copolymer is concentrated at the interface between the filler and base polymer.

The block copolymer additive of the present invention contains two polymerized comonomers. One of the polymerized comonomer components is compatible or substantially miscible with the base polymer. Because it, itself, is compatible, it tends to make the block copolymer compatible with the base polymer, thereby facilitating distribution of the block copolymer therein and stabilizing it in the composition. By "compatible" it is meant substantially stable therein or substantially miscible therein. An example of such a compatibility-imparting polymerized comonomer is styrene for a base polymer such as polystyrene and polyphenyleneoxide. The second polymerized comonomer component must be sufficiently surface-active in the present composition so that the block copolymer is concentrated at the interface of the filler to substantially envelop it. A typical example of such surface-activity-imparting comonomers are organosiloxanes such as dimethylsiloxane. The base polymer of the present composition, i.e. the polymer serving as a matrix for the filler is a solid and may be a homopolymer, a copolymer or even a mixture of polymers.

The block copolymer additives used in the present invention can vary in composition and structure. They may be graft, branched, or linear block copolymers, but being block copolymers, they contain repeating segments or blocks of the same monomeric unit and these blocks have a length close to the average block length for that particular monomer. However, the average block length of one polymerized comonomer component can differ from the average block length of a second polymerized comonomer component and the relative average block lengths largely determine the properties of the block copolymer.

An example of a linear block copolymer of A and B monomeric units may have the following structure:

... AAAAABBBAAAABBBBAAAAAABB ...

where the A block has an average of 5 units and the B block averages 3 units. An example of a graft block copolymer of A and B monomeric units may have the following structure:

```
... AAAAAAA ...         ... AAAAAAA ...
       B                       B
       B                       B
       B                       B
       B                       B
```

As is well known in the art, the block copolymer is distinguishable from random copolymers which do not contain substantially uniform blocks of the same comonomer, e.g. copolymers which on the average contain no particular repeating sequence of the same monomeric units and which may have combinations of units varying widely in length and dispersion (e.g., ABAAAABABBAABBBABAB ...)

Random copolymers, therefore, are not useful in the present invention since, as a practical matter, they cannot be prepared to have the predetermined properties of the present block copolymers.

The block copolymer additives of the present invention can be prepared by a number of conventional techniques. They should be prepared, however, so that they will have the desired compatibility with the base polymer and also be sufficiently surface-active in the composition to concentrate at the interface of the filler substantially enveloping it. The molecular weight of the block copolymer may vary widely but it should be sufficiently high so that it is non-volatile in the preparation of the present composition and its use. For most applications, the compatibility imparting polymerized comonomer component of the block copolymer additive should have an average block length of at least three monomer units, and the surface-active polymerized comonomer component of the additive which promotes wetting of the filler and adherence thereto should have an average block length of at least five monomer units. The maximum average block length of each comonomer component can only be determined empirically, i.e. it depends largely on the amount of the block copolymer additive used with a particular base polymer-filler composition since the effect of a particular polymerized comonomer component of the block copolymer additive can be reduced by using a smaller amount of the additive.

The amount of the block copolymer used may be determined empirically and would depend largely on its composition as well as the polymer-filler composition. The block copolymer should be used in at least an amount sufficient to substantially form a film between the filler and base polymer. The block copolymer should not, however, be used in an amount which would undesirably alter the properties of the base polymer-filler composition to a significant extent. For most applications, the amount of the block copolymer additive ranges from about 0.1 to about 100 percent by weight of the filler depending largely on its surface area.

The block copolymer additive can be included in the polymer-filler composition by a number of conventional techniques. For example, the filler can be precoated with a solution of the block copolymer by well known techniques such as simply mixing the filler with the solution, or spraying the filler with the solution, and allowing the solvent to evaporate. The coating of block copolymer should substantially envelop the filler. In some instances, a more tenacious coating of the block copolymer is developed by heating the coated filler at an elevated temperature. The dried coated filler is then admixed with the molten base polymer to produce a substantially uniform distribution of the filler therein.

If the block copolymer additive is admixed in the melt with the base polymer and filler, the mixing should be carried out so that the whole system becomes fluid enough to permit migration of the block copolymer to the filler interface in amount sufficient to substantially envelop the filler. The concentration of the block copolymer at the filler interface may vary in thickness but it should be of at least a film-forming thickness. In the present composition, the surface-active component of the block copolymer wets the filler and adheres the additive thereto while the compatibility-imparting component extends into the base polymer thereby allowing the additive to provide an enhanced interaction between the filler and base polymer.

The resulting polymer-filler composition can be shaped by a number of conventional techniques. For example, it can be molded by extrusion, by injecting molding, compression molding or vacuum molding.

Specifically, in forming the block copolymer additive of the present invention, one comonomer is selected to provide the desired surface activity, as for example, an organosiloxane. As the compatibility-imparting constituent, a second comonomer is selected which is identical to or compatible with the base polymer, as for example, styrene when the base polymer is polystyrene or polyphenylene oxide.

There are a number of specific surface-active block-copolymer-base polymer systems which can be used in the composition of the present invention. A typical example is a polycarbonate-polydimethylsiloxane block copolymer with polycarbonate as the base polymer. Another specific system is a polystyrene-polydimethylsiloxane block copolymer for use with base polymers such as polystyrene or polyphenyleneoxide. In addition, we have found that the block copolymer may contain certain substituents which impart to it the necessary compatibilty, and an example of such a system is polydiphenylsiloxane-polydimethylsiloxane block copolymer with polymethylphenylsiloxane as the base polymer.

In some instances, the compatibility-imparting polymerized comonomer may differ substantially in structure from the base polymer but, in its block form, as a constituent of the block copolymer, it is capable of acting as the compatibility-imparting component of the block copolymer. For example, we have found that a polycarbonate-polydimethylsiloxane block copolymer is compatible with an epoxy resin, as for example the epoxy resin formed from epichlorohydrin and 2,2-bis(p-hydroxyphenyl) propane known as bisphenol A and sold under the trademark Epon 828.

The filler used in the present composition can vary in form. For example, it can be in particulate form, fibrous form or a pigment. The amount of filler used depends on the application of the shaped composition.

Representative of the inorganic fillers useful in the present invention are glass fibers, asbestos, ground ceramics, titanium dioxide, silica, mica, treated clays, carbon black, calcium carbonate, fibrous magnesium silicate, quartz, kryolite, portland cement and metal powders such as iron powder, aluminum powder and copper powder and metal salts and oxides. Typical of the organic fillers which may be used are shredded textiles, sisal fiber and long-fibered wood pulp.

All parts and percentages used herein are by weight unless otherwise noted.

The invention is further illustrated by the following examples.

In the following examples, the tests and materials used were as follows:

The polycarbonate (Standard Molding Grade 106) used is sold under the trademark Lexan and is a polycarbonate of 2,2-bis(4-hydroxyphenyl) propane (bisphenol A).

The polycarbonate-polydimethylsiloxane block copolymer was prepared substantially as set forth in U.S. Pat. No. 3,189,662, issued June 15, 1965 and assigned to the same assignee as the present invention. The polycarbonate was the intercondensation product of 2,2-bis(4-hydroxyphenyl) propane and phosgene.

The polydiphenylsiloxane-polydimethylsiloxane block copolymer was prepared as set forth in U.S. Pat. No. 3,337,497 issued Aug. 22, 1967.

The particular composition and average block length of the block copolymer was determined by method of preparation, by nuclear magnetic resonance spectroscopy and elemental analysis.

The molecular weight is the number average molecular weight.

EXAMPLE 1

Raw glass fibers (P-673 Owens Corning) having an average diameter of 0.51 mil and a length of ¼ inch were used. These fibers had been wet-chopped and had no sizing.

A polycarbonate-polydimethylsiloxane block copolymer having a number average molecular weight of 62,800 was used which was composed of 35 percent by weight polycarbonate having an average block length of 3.5 monomer units and 65 percent by weight polydimethylsiloxane having an average block length of 20 monomer units. A 5 percent solution of the block copolymer was formed in methylene chloride at room temperature. 100 ml. of the solution were admixed with 50 grams of the fibers to deposit the block copolymer on the fibers in an amount of 10 percent by weight of the fibers. The fibers were admixed with the solution until they were thoroughly wetted to produce a uniform coating of the copolymer. These copolymer treated fibers were initially dried in air and then in an oven at 200° C. for 30 minutes. The resulting dried fibers stuck together to form a mat which had to be broken apart by hand. The coating of the block copolymer was substantially uniform and had substantially enveloped the fibers.

The coated fibers were dry-blended with granular polycarbonate in a jar by tumbling. The coated fibers were used in an amount of 20 percent by weight of the polycarbonate. The blend was then extruded by means of a one-inch conventional extruder to form a strand which was chopped, re-blended again in the jar by tumbling and re-extruded in the same manner. The resulting strand was then molded in a conventional ram-type injection molding press under a pressure of 10 tons p.s.i. at a temperature of 590° F. to form impact bars ¼ inch thick, ¼ inch wide and 2 inches long. The impact resistance was determined by means of the standard Izod method substantially according to ASTM D-256. One bar, in unnotched condition, had an impact resistance of 48 inch pounds. A second bar, in notched condition, had an impact resistance of 12 inch pounds per inch of notch.

Control samples, i.e. bars, were prepared in the same manner and were of the same composition except that raw glass fiber with no block copolymer was used. These control samples were also tested for impact resistance in the same manner. One control sample, in unnotched condition, had an impact resistance of 22 inch pounds, and a second control sample, in notched condition, had an impact resistance of 8 inch pounds per inch of notch. This illustrates that the block copolymer treated glass fibers of the present invention provided a significant increase in the impact resistance of the fiber-containing polycarbonate in the unnotched, as well as the notched, condition.

EXAMPLE 2

In this example, portions of raw glass fibers as well as sized glass fibers were treated with a polydiphenylsiloxane-polydimethylsiloxane block copolymer before being incorporated into the polycarbonate to determine the affect of the block copolymer. The polydiphenylsiloxane-polydimethylsiloxane block copolymer had a number average molecular weight of 228,000 gms./mole and was comprised of 45.6 percent by weight polydiphenylsiloxane having an average block length of 60 monomer units and 54.4 percent by weight polydimethylsiloxane having an average block length of 1370 monomer units.

The raw glass fibers used were the same as those disclosed in Example 1. 135 grams of the raw glass fibers were treated with 480 ml. of a solution comprised of 13.5 grams of the block copolymer dissolved in a mixed solvent of 1:2 chloroform:methylene chloride. The fibers were admixed with the solution until they were thoroughly wetted to produce a uniform coating of the copolymer and then they were allowed to dry in air at room temperature. The dry fibers had a deposit of block copolymer in an amount of 10 percent by weight of the fibers. A second 135 gram sample of the raw fibers were coated in the same manner with 615 ml. of a solution comprised of 27 grams of the block copolymer dissolved in a mixed solvent of 1:1 chloroform:methylene chloride to deposit the block copolymer in an amount of 20 percent by weight of the glass fibers.

Each of these block copolymer coated samples, as well as a 135 gram control sample of raw glass fibers alone, were pre-mixed with polycarbonate to form a mixture containing the fibers in an amount of 20 percent by weight of the polycarbonate. Mixing was carried out on a 10 inch by 16 inch two-roll mill at a temperature of 200–225° C. by passing the fiber-polycarbonate composition between the rolls until a substantially uniform dispersion of the fibers in the polycarbonate was obtained. The resulting mixture of each composition was then allowed to harden by cooling to room temperature, and it was then chopped to a fine feed size. Each such chopped mixture was then molded in a Newberry Screw Injection Molding Press using a mold preheated to 150° F., a 30 ton clamping pressure and a final barrel temperature of 600° F. Each sample composition was used to form impact bars ½ inch wide, 0.1 inch thick and 6 inches long as well as dumbbell shaped standard tensile bars of the same dimensions. The molding cycle, in each instance, was 40 seconds.

Each molded sample was conditioned for 24 hours at 50 percent relative humidity and a temperature of 73° F. The molded samples were then tested according to ASTM methods and the results are shown in the following table. Each value given in the table is an average of three values.

For comparison purposes, a portion of the raw glass fibers was primed, i.e. sized, with a conventional sizing having the following formulation:

|  | Grams |
|---|---|
| Ethylsilicate (ES 40) | 15 |
| Ethylorthosilicate | 150 |
| Polymeric butyl titanate (Tizor PB) | 40 |
| 6% solution of cerium neodecanoate | 9 |

The sizing formulation was diluted with 300 grams of mineral spirits and 200 ml. of hexane. 150 ml. of the resulting solution was admixed with 375 grams of the raw glass fibers until the fibers were thoroughly wetted. The sized fibers were then spread in a flat dish, dried in an oven at 175° C. for 2 hours and 20 minutes, and then dried overnight at room temperature. The sized fibers contained 39 grams of sizing for 860 grams of glass fibers or about 5% by weight of the glass fibers.

135 gram samples of the sized glass fibers were coated with the same block copolymer and in the same manner as were the raw glass fiber samples to deposit the same amounts of block copolymer as indicated in the table. These coated sized fibers were then admixed with the polycarbonate in the same amount as the raw fibers, i.e. 20 percent by weight of the polycarbonate, and molded in the same manner. The results are shown in the following table.

| Tests | | Samples formed with raw glass fibers | | Samples formed with sized glass fibers | | |
|---|---|---|---|---|---|---|
| | | Control sample (No block copolymer) | 10% block copolymer deposit | Control sample (No block copolymer) | 10% block copolymer deposit | 20% block copolymer deposit |
| Tensile yield strength (p.s.i.) | ASTMD 638 using cross head speed 0.1 inch/min. | 7,020 | 6,540 | 7,480 | 6,760 | 6,440 |
| Rupture strength (p.s.i.) | do | 6,370 | 6,610 | 6,450 | 6,420 | 6,030 |
| Yield elongation, percent | do | 4.5 | 5.4 | 4.15 | 4.3 | 5.6 |
| Rupture elongation, percent | do | 52 | 79.0 | 31.5–52 | 75 | 57 |
| Secant modulus (p.s.i.) at 1% Elongation | do | 441,000 | 391,000 | 422,000 | 421,000 | 366,000 |
| Tangent modulus (p.s.i.) at 1% Elongation | do | 509,000 | 571,000 | 468,000 | 763,000 | 586,000 |
| Izod impact resistance: | | | | | | |
| Notched (foot pounds) | ASTMD 256 | 3.10 | 8.41 | 1.82 | 8.26 | 9.36 |
| Unnotched (foot pounds per inch of notch) | do | >50 | (¹) | >50 | >50 | >50 |

¹ Deformation, no break.

The table shows that the samples containing glass fibers coated with block copolymer according to the present invention have significantly higher notched impact resistance values and rupture elongation than the control samples where the glass fibers were not treated with the block copolymer. This indicates that the compositions of the present invention are more durable, tougher materials.

In copending U.S. patent application Ser. No. 839,695 filed on the same day as the present patent application by Edgar E. Bostick, George L. Gaines, Jr. and Donald G. Le Grand, and assigned to the same assignee as the present invention, there is disclosed a laminate structure having improved resistance to delamination formed from alamina which is initially coated or impregnated with a surface-active block copolymer and then coated or impregnated with a binder or base polymer.

What is claimed is:

1. A solid polymer-filler composition having an improved stable bond therebetween provided by a surface-active block copolymer additive concentrated at the filler interface comprising a synthetic aromatic base matrix polymer, a filler and a synthetic surface-active block copolymer additive, said additive being comprised of a first polymerized aromatic comonomer and a second polymerized organosiloxane comonomer, said first polymerized aromatic comonomer having an average block length of at least three monomer units and being sufficiently compatible with and miscible in the aromatic base matrix polymer to make said additive stable therein, and the second polymerized comonomer having an average block length of at least five monomer units and being sufficiently surface-active in the composition so that the block copolymer additive is concentrated at the interface between the filler and base matrix polymer to wet the filler, said block copolymer additive being present in an amount ranging from at least an amount sufficient to substantially coat said filler up to about 100 percent by weight of the filler.

2. A polymer-filler composition according to claim 1 wherein the structure of the comonomer of said first polymerized aromatic comonomer of said additive is the same as the structure of the monomer of said aromatic base matrix polymer.

3. A composition according to claim 1 wherein said aromatic base matrix polymer is a polycarbonate, said first polymerized comonomer is polycarbonate and said second polymerized comonomer is polydimethylsiloxane.

4. A composition according to claim 3 wherein said filler is glass fiber.

5. A composition according to claim 1 wherein said aromatic base matrix polymer is polycarbonate, said first polymerized comonomer is polydiphenylsiloxane and said second polymerized comonomer is polydimethylsiloxane.

6. A composition according to claim 5 wherein said filler is glass fiber.

7. A composition according to claim 1 wherein said aromatic base matrix polymer is polystyrene, said first polymerized comonomer is polystyrene and said second polymerized comonomer is polydimethylsiloxane.

8. A process for preparing a shaped solid polymer-filler composition with an improved stable bond therebetween provided by a surface-active block copolymer additive concentrated at the filler interface comprising melt-blending a synthetic aromatic base matrix polymer, filler and a synthetic surface-active block copolymer additive so that said additive is concentrated at the interface between said synthetic aromatic base matrix polymer and filler to substantially coat said filler, and then shaping said composition, said synthetic block copolymer additive being comprised of a first polymerized aromatic comonomer and a second polymerized organosiloxane comonomer, said first polymerized aromatic comonomer having an average block length of at least three monomer units and being sufficiently compatible with and miscible in said synthetic aromatic base matrix polymer to make said additive stable therein, and said second polymerized organosiloxane comonomer having an average block length of at least five monomer units and being sufficiently surface-active in said composition so that the block copolymer additive is concentrated at the interface between the base matrix polymer and filler to substantially wet the filler, said block copolymer additive being present in an amount ranging from at least an amount sufficient to substantially coat the filler up to about 100 percent by weight of the filler.

9. A process according to claim 8 wherein said aromatic base matrix polymer is a polycarbonate, said first polymerized comonomer is polycarbonate and said second polymerized comonomer is polydimethylsiloxane.

10. A process according to claim 9 wherein said filler is glass fiber.

11. A process according to claim 8 wherein said aromatic base matrix polymer is polycarbonate, said first polymerized comonomer is polydiphenylsiloxane and said second polymerized comonomer is polydimethylsiloxane.

12. A process according to claim 11 wherein said filler is glass fiber.

13. A process according to claim 8 wherein said aromatic base matrix polymer is polystyrene, said first polymerized comonomer is polystyrene and said second polymerized comonomer is polydimethylsiloxane.

14. A process for preparing a shaped solid polymer-filler composition with an improved stable bond therebetween provided by a synthetic surface-active block copolymer additive pre-coated on said filler comprising coating the filler with a solution of said synthetic surface-active block copolymer additive, allowing said additive-coating to dry, admixing the additive-coated filler with a synthetic aromatic base matrix polymer in molten form to provide a substantially uniform dispersion of the additive-coated filler in the base matrix polymer, and shaping the resulting mixture, said block copolymer additive being comprised of a first polymerized aromatic comonomer and a second polymerized organosiloxane comonomer, said first polymerized aromatic comonomer having an average block length of at least three monomer units and being sufficiently compatible with and miscible in said synthetic aromatic base matrix polymer to make said additive stable therein, and said second polymerized organosiloxane comonomer having an average block length of at least five monomer units and being sufficiently surface-active in said composition so that the block copolymer additive is substantially maintained at the interface between the base matrix polymer and filler, said block copolymer additive being present in an amount ranging from at least an amount sufficient to substantially coat the filler up to about 100 percent by weight of the filler.

15. A process according to claim 14 wherein said base matrix polymer is a polycarbonate, said first polymerized comonomer is polycarbonate and said second polymerized comonomer is polydimethylsiloxane.

16. A process according to claim 14 wherein said base matrix polymer is a polycarbonate, said first polymerized comonomer is polydiphenylsiloxane and said second polymerized comonomer is polydimethylsiloxane.

17. A solid composition comprising a filler and a surface-active block copolymer additive, said additive being comprised of a first polymerized aromatic comonomer having an average block length of at least three monomer units and a second polymerized organosiloxane comonomer having an average block length of at least five monomer units, said first polymerized comonomer forming a stable solid coating substantially enveloping the filler and said second polymerized comonomer being surface-active and forming an adherent stable bond to the surface of the filler, said block copolymer additive being selected from the group consisting of polycarbonate-polydimethylsiloxane, polystyrene-polydimethylsiloxane, and polydiphenylsiloxane-polydimethylsiloxane block copolymers, and said block copolymer additive being present in an amount ranging from at least an amount sufficient to substantially coat said filler up to about 100 percent by weight of the filler.

18. A process according to claim 15 wherein said filler is glass fiber.

19. A process according to claim 16 wherein said filler is glass fiber.

20. A composition according to claim 1 wherein said base matrix polymer is polyphenyleneoxide, said first polymerized comonomer is polystyrene and said second polymerized comonomer is polydimethylsiloxane.

21. A composition according to claim 1 wherein said base matrix polymer is polymethylphenylsiloxane, said first polymerized comonomer is polydiphenylsiloxane and said second polymerized comonomer is polydimethylsiloxane.

References Cited

UNITED STATES PATENTS

| | | | |
|---|---|---|---|
| 3,087,908 | 4/1963 | Caird | 260—824 UX |
| 3,419,634 | 12/1968 | Vaughn | 260—824 |
| 3,419,635 | 12/1968 | Vaughn | 260—824 |
| 3,457,173 | 7/1969 | Pater | 260—824 EP UX |

LEWIS T. JACOBS, Primary Examiner

U.S. Cl. X.R.

260—37 N, 41 R, 824 R, 825